United States Patent [19]

Boyd et al.

[11] 4,011,685
[45] Mar. 15, 1977

[54] PLANT INJECTION METHOD AND APPARATUS

[76] Inventors: William A. Boyd, 430 N. Mashta Drive, Key Biscayne, Fla. 33149; Richard T. Britt, 4580 NW. 79th Ave., Miami, Fla. 33166

[22] Filed: Dec. 22, 1975

[21] Appl. No.: 642,780

Related U.S. Application Data

[63] Continuation of Ser. No. 482,268, June 24, 1974, abandoned.

[52] U.S. Cl. .............................. 47/57.5; 128/215; 21/73
[51] Int. Cl.² .......................................... A01G 29/00
[58] Field of Search ................ 47/57.5, 58; 21/73; 128/218, 215

[56] References Cited
UNITED STATES PATENTS

| | | | |
|---|---|---|---|
| 1,982,975 | 12/1934 | Aiken | 47/57.5 UX |
| 2,290,363 | 7/1942 | Stirton | 47/57.5 UX |
| 3,130,519 | 4/1964 | Mauget | 47/57.5 |
| 3,254,449 | 6/1966 | Mauget | 47/57.5 |
| 3,295,254 | 1/1967 | Schoonman | 47/57.5 |
| 3,832,803 | 9/1974 | Blake et al. | 47/57.5 |
| 3,968,594 | 7/1976 | Kawakami | 47/57.5 |

*Primary Examiner*—Robert E. Bagwill

[57] ABSTRACT

A plant injection device is disclosed which comprises a narrow injection needle having a smooth outer surface, a variable high pressure system having a one-way output valve in the body of the device, and a fluid reservoir. The needle portion of the device may be inserted into the plant either by applying force to the body of the device or by drilling hole sized relative to the width of the needle in the plant and inserting the needle therein. The device allows a fluid to be injected into the tree within minutes at the optimum fluid pressure for the particular plant, thereby providing a single visit plant injection method. The high pressure acts upon the interior of the plant body to force the sides of the hole to contract about the outer surface of the needle thereby forming a pressure seal which prevents fluid from escaping around the needle.

17 Claims, 4 Drawing Figures

U.S. Patent    Mar. 15, 1977    4,011,685
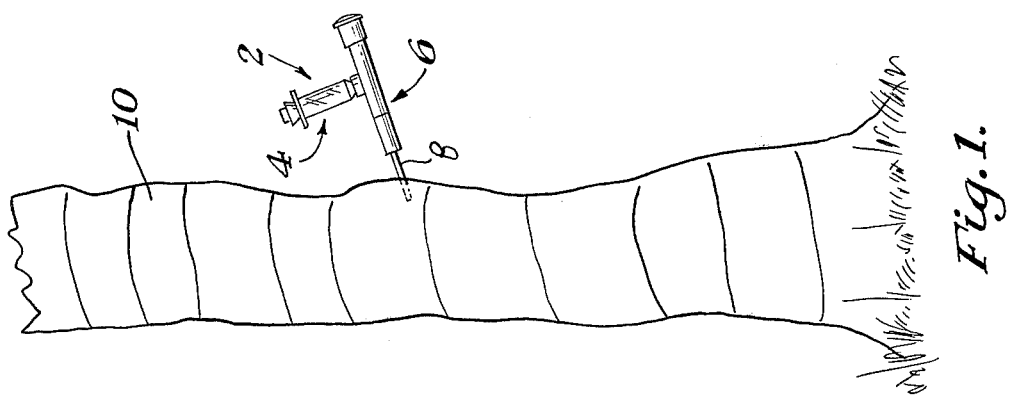
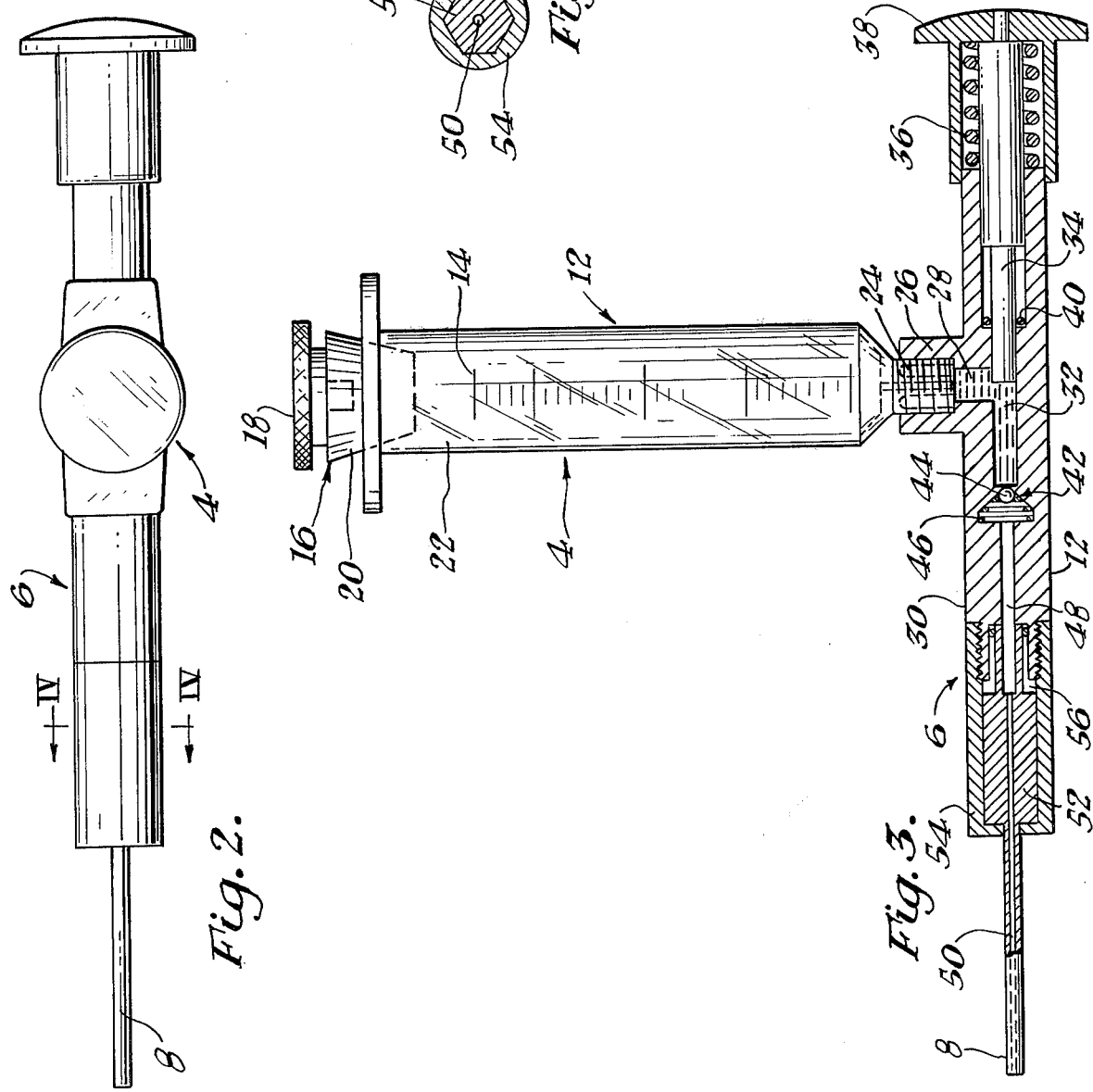
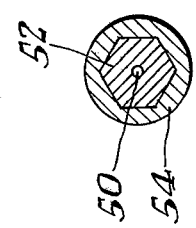
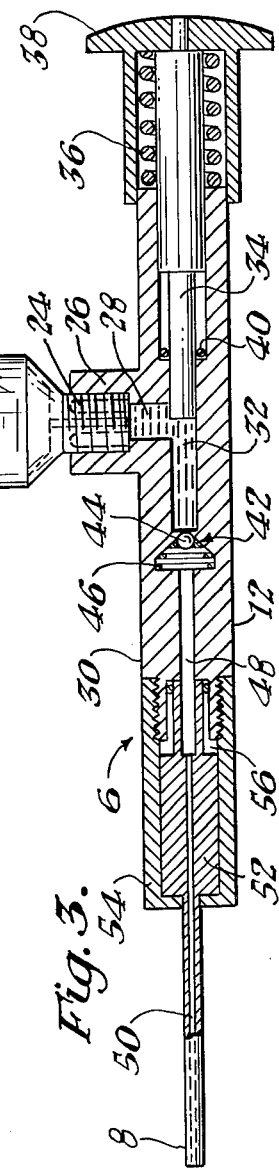

PLANT INJECTION METHOD AND APPARATUS

This is a continuation of application Ser. No. 482,268, filed June 24, 1974 (now abandoned).

BACKGROUND OF THE INVENTION

In the past, various types of dispensing means have been developed which place fluid into trees and the like. Representative of such means are those shown in Berger U.S. Pat. No. 722,776, Beaufils, et al. U.S. Pat. No. 2,970,404, Cravens U.S. Pat. No. 3,367,065, Mauget U.S. Pat. No. 3,124,904, and Stirton U.S. Pat. No. 2,290,362. Many of these dispensing means require the user to puncture the tree with a drill, or the like, prior to the insertion of the device. Thereafter, separate tube means are placed in the opening in the tree and fluid is passed therethrough for an extended period of time. For example, the Mauget means has to be attached to a tree for an extended period of time in order to dispense the fluid into the tree. Thus, the use of the Mauget apparatus requires a minimum of two visits to the plant site, the first for hole drilling and insertion of the device and the second for apparatus removal and hole repair. There is, therefore a need for a rapid and efficient plant injection method and apparatus.

An object of this invention is to provide a high-pressure plant injection device that can effectively inject more concentrated or more viscous material into a plant.

Another object of this invention is to provide a self-sealing needle to insert into a plant for injecting high-pressure fluid into a plant.

A further object of this invention is to provide a plant injection device and method that provides a quick, one-visit operation.

Another object of this invention is a means for quickly injecting plants with antibiotics, fungacides, insecticides, plant nutrients and fertilizer for arresting and/or curing disease, arresting and/or destroying blight and pests, and for aiding the growth of plants.

Another object of this invention is to provide a low cost variable high-pressure injection device for injecting plants or trees.

A further object of this invention is to provide a plant injection device constructed to receive a direct force to the body of the injection device in order to move the needle into the interior of a tree or plant.

A further object of this invention is to provide a one-visit plant injection device with a variable pressure means to vary the fluid pressure for each particular plant or tree being injected.

An additional object of this invention is to provide a low cost device for effective plant injection by homeowners.

SUMMARY

I have discovered a novel, one step, rapid, plant injection method, and a variable pressure plant injection apparatus with self-sealing needle for accomplishing the method. The plant injection device combines a narrow injection needle having a smooth outer surface, and a variable high pressure system having a one-way valve for placing the liquid stored in a reservoir of the device into the inner portions of a plant under high pressure. The needle may be placed into a previously drilled hole having a diameter sized relative to the diameter of the needle or, alternatively, the needle may be inserted directly into a tree or plant by applying force to the body. A pumping system provides the means for increasing the fluid pressure during injection. I have found that, by using a high pressure injection apparatus, the plant fibers seal the needle in the hole of the plant during injection. Therefore, the optimum fluid pressure may be utilized to dispense a measured amount of fluid from a refillable measuring reservoir into the interior of a tree or plant in a fast, one-step operation.

The injection device includes an injection needle for penetrating the tree or plant, a body having a one-way exit valve and a variable pressure pumping system, and a refillable measuring reservoir. The variable pressure pumping system allows the preselection of the optimum injection pressure for the particular plant or tree being injected. The body of the device is constructed of a strong tubular-shaped body with a strong, narrow needle connected in a manner designed to withstand an insertion force applied directly to the pumping system body in order to force the needle into a tree or plant. The pumping system includes a cavity connected to both a reservoir and a needle, a hand operated pumping means, and a one-way valve that allows the build-up of fluid pressure in the fluid which has been transferred from the refillable measuring reservoir to the needle.

BRIEF DESCRIPTION OF THE DRAWINGS

FIG. 1 is a side view of a plant injection device in association with a tree;

FIG. 2 is a top view of the plant injection device;

FIG. 3 is a side view of the plant injection device partially in cross-section; and FIG. 4 is a front cross-sectional view of FIG. 2 along lines IV—IV and looking in the direction of the arrows.

DESCRIPTION OF THE PREFERRED EMBODIMENT

Referring now to the drawings, and particularly to FIG. 1, showing the new and improved plant injection device, generally designated by 2, the injection device includes a refillable reservoir 4 for holding the fluid being injected into a plant, a pumping system 6, and a narrow polished needle 8. FIG. 1 shows the injection device 2, with a portion of the needle inserted into a tree 10, such as a broad leaf, palmae or palm tree.

Referring now to FIG. 2 and FIG. 3, the plant injection device 2 includes a refillable reservoir 4 having a transparent body 12 with etched volume markings 14 thereon, a variable fluid pressure build-up system 6 and a needle 8 that may be forced into a tree. The refillable container or reservoir 4 may be constructed out of a clear glass or plastic material. The container may include a removable cap 16 having an enlarged grip portion 18 and cone-shaped connecting portion 20. The transparent body 12 includes a rigid upper container portion 22 for holding the fluid, and a threaded exit 24 for securing the transparent body to the main body 30 of the plant injection device 2. The main body 30 includes an inlet with a mating threaded portion 26 for receiving the exit 24 of the reservoir.

A transverse conduit 28 is located in the main body 30 of the pressure system 6 between the mating threaded portion 26 and a pressure chamber 32. The pressure chamber 32 is sized and shaped to receive a movable piston 34 that is biased rearwardly by spring 36. One end of the piston 34 projects rearwardly out of the body 30. The piston 34 is connected to a handle or palm pressure means 38. The pressure may be increased gradually over a period of time to find the optimum plant pressure. An O-ring 40 may be connected in a first position about the piston 34 as shown in FIG. 2 to prevent fluid from flowing out of the plant injection device 2. The O-ring also may be located in a second position between the main body 30 and the spring 36, touching one end of the main body 30. The piston 34 includes an enlarged portion with a flange for limiting the inward movement of handle 38. When the O-ring is in the second position, the piston and spring may be designed to allow the flange to bottom before the spring bottoms on the O-ring. The design allows the handle to be hit with a hammer to drive the needle into a tree. At the other end of the pressure chamber 32 in the body 30 is a one-way ball valve 42. The ball valve 42 includes a ball 44 and a spring means 46. Alternatively, a check valve may be used. The fluid is placed under pressure by the inward movement of piston 34 from a first position as shown in FIG. 3 to a second position to the left. The fluid is moved from chamber 32 through conduit 48 and out through conduit 50 in needle 8.

The needle means includes a needle portion 8 and an enlarged end 52 that is connected to the body 30 by the cap screw means 54. An O-ring 55 is connected about the smaller portion of needle end 52 in cavity 56. The O-ring may be located adjacent the larger portion of the needle end 52.

Referring now to FIG. 4, showing a cross-section of FIG. 2, along the lines IV—IV looking in the direction of the arrows, the cap screw means 54 has an internal hexagonal cavity in order to accomodate the enlarged hexagonal end 52 of the needle 8. The hexagonal cavity 56 prevents relative rotation between the needle portion 8 and the main body 30. We contemplate, of course, that any polygonal cavity and end would give equivalent rotation resistance.

In use, the operator may rapidly inject a tree or plant with fluid in a one-visit operation by first filling the reservoir with the desired fluid, inserting the needle 8 of body 30 into the tree, connecting the filled reservoir to the body, filling pressure chamber 32 with fluid from the reservoir, and applying the desired amount of pressure to handle 38. The needle portion may be inserted into the tree either by the application of force to the body, i.e. by hammering, or by first making a needle-size hole in the tree's exterior and then inserting the needle therein. Needle 8 may preferably be between about 1½ and about 2 inches long and have an outside diameter of between about 9/64 and about 11/64 of an inch. By repeating the filling-pressing cycle, the user may increase the pressure of the fluid in the needle portion between the tree and the valve 42 to the desired pressure by moving the piston 34 back and forth. By such pumping action, the fluid pressure may be increased to as much as 5000 p.s.i.

The rate of the flow of fluid into the tree is increased by increasing the pressure. Unexpectedly, however, an increase in fluid pressure results, not in loss of fluid due to seepage around the needle-hole interface, but rather in the tightening of the fibrous walls of the hole about the needle. The user, therefore, seals the needle portion in the hole by pressurizing the fluid. Nevertheless, the user can remove the needle 8 after a relatively short period of time after he stops pumping, due to the fact that, as the fluid diffuses through the tree, the pressure in the vicinity of the hole diminishes, and the seal's tightness lessens. The user then repairs the opening in the tree or plant before he moves to another location.

Thus, whereas the conventional injection devices took a portion of a day or days to place fluid into a tree, our device at 2,000 psi can place 60 cc of Terramycin mixed with water into a palm tree in 1 or 2 minutes. Older devices, such as that disclosed in the Mauget Patent, required significantly longer periods of time to inject the same amount of the drug.

A similar injection device may be used to pressurize a plurality of short needles that pass just through the bark and are spaced around the tree trunk, such as an elm or oak tree.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A novel method of injecting plant material comprising:
    injecting a needle into the plant material,
    placing pressurized fluid through said needle into said plant,
    the fluid under pressure initially being in an amount sufficient to create a force to seal the surrounding plant material and the outer wall of the needle together to seal the fluid under pressure placed into the plant material from escaping out of the plant material adjacent the outer wall of the needle,
    subsequently providing additional fluid under pressure to place additional fluid into the plant material,
    stopping additional fluid input through the needle into the plant material.

2. A novel method of injecting plant material as set forth in claim 1 wherein:
    said plant material is a living plant,
    said additional pressure automatically increases the force to seal the surrounding plant material and the outer wall of the needle.

3. A novel method of injecting plant material as set forth in claim 2 including:
    removal of the needle from the plant material after a reduction in the force to seal the surrounding plant material and the outer wall of the needle.

4. A novel method of injecting plant material as set forth in claim 3 wherein:
    said method provides the placing of a quantity of fluid into the plant material within a few minutes.

5. A novel method of injecting plant material as set forth in claim 1 wherein:
    said method provides the placing of a quantity of fluid into the plant material within a few minutes.

6. A novel method of injecting plant material as set forth in claim 5 wherein:
    said initial pressure being over 100 pounds per square inch.

7. A novel method of injecting plant material as set forth in claim 5 wherein:
    said initial pressure being over 150 pounds per square inch.

8. A novel method of injecting plant material as in claim 5 wherein:
    the subsequently provided additional fluid under pressure is provided at the optimum fluid pressure acceptance level of a particular type of plant to provide a fast injection of a quantity of fluid.

9. A novel method of injecting plant material as set forth in claim 1 wherein:
the subsequently provided pressure is in the thousands of pounds per square inch to provide a single plant material contact method.

10. A novel method of injecting plant material as set forth in claim 1 wherein:
the method is for palm trees, and
the pressures of the fluids are from approximately 100–150 PSI to 2000–5000 PSI.

11. A novel method of injecting plant material as set forth in claim 3 wherein:
the quantity of fluid is approximately 60 cc of liquid.

12. A novel method of injecting plant material as set forth in claim 1 wherein:
the subsequently provided additional fluid under pressure is provided at the optimum fluid pressure acceptance level of a particular type of plant to provide a fast injection of a quantity of fluid.

13. A novel method of injecting plant material as set forth in claim 12 wherein:
the needle includes a generally smooth outer surface that provides a sealing surface.

14. A plant fluid injection device including, a plant injection needle portion with a wall and a hollow interior portion, a body portion connected to said needle portion, a pumping portion connected to said body portion and said needle portion, said needle, body and pumping portions connected to one another and said pumping portion being at one end of said body, said needle being at the opposite end of said body portion, said body portion having a conduit therein with a fluid entrance, fluid exit and a pumping conduit portion, the improvement comprising:
said body having a one way valve therein whereby inward movement of said pumping portion opens said valve to permit passage of fluid into said needle through the hollow interior portion and outwardly therefrom into a plant and provides a means to build up pressure at the distal end of the needle,
said wall constructed to withstand an internal pressure in the thousands of pounds per square inch,
said pumping portion providing thousands of pounds per square inch of fluid pressure.

15. A plant fluid injection device as set forth in claim 6 including:
said needle portion including a smooth outer sealing surface.

16. A plant fluid injection device as set forth in claim 6 including:
said outer sealing surface is approximately 11/64 to 9/64 of an inch in width.

17. A plant injection device as set forth in claim 6 including:
said needle, body and pumping portions connected to one another and being substantially longitudinally aligned,
said pumping portion being telescopically received by said body,
said body portion and said pumping portion arranged to be supported and pumped by a single hand of an operator.

* * * * *